(12) United States Patent
Yuhara et al.

(10) Patent No.: US 8,442,799 B2
(45) Date of Patent: May 14, 2013

(54) INFORMATION PROCESSING SYSTEM AND INFORMATION PROCESSING PROGRAM

(75) Inventors: Hiromitsu Yuhara, Wako (JP); Masayuki Habaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 542 days.

(21) Appl. No.: 12/670,641

(22) PCT Filed: Jul. 31, 2008

(86) PCT No.: PCT/JP2008/002064
§ 371 (c)(1),
(2), (4) Date: Jan. 25, 2010

(87) PCT Pub. No.: WO2009/040977
PCT Pub. Date: Apr. 2, 2009

(65) Prior Publication Data
US 2010/0217560 A1    Aug. 26, 2010

(30) Foreign Application Priority Data
Sep. 28, 2007    (JP) .................. 2007-255781

(51) Int. Cl.
*G01C 9/00*    (2006.01)
(52) U.S. Cl.
USPC ........................................ 702/150

(58) Field of Classification Search ............. 702/150
See application file for complete search history.

(56) References Cited

U.S. PATENT DOCUMENTS 5,486,822 A * 1/1996 Tenmoku et al. ........ 340/995.22
2007/0049260 A1   3/2007 Yuhara et al.

FOREIGN PATENT DOCUMENTS

| JP | 8-292037 A | 11/1996 |
| JP | 2000-258174 A | 9/2000 |
| JP | 2007-40912 A | 2/2007 |
| JP | 2007-51974 A | 3/2007 |

* cited by examiner

*Primary Examiner* — Stephen Cherry
(74) *Attorney, Agent, or Firm* — Arent Fox LLP

(57) ABSTRACT

A system for smoothly executing information processing in the case where information processing is executed to all of the information in relation to a target area, and at the same time other information processing is executed in parallel thereto. In information processing system 10, each of a plurality of mesh groups differing from one another is decided as a first mesh group through an n-th mesh group (n=2, 3, . . . ), respectively. A predetermined information processing is executed to the mesh information group in relation to each mesh group in the order from the first mesh group to the n-th mesh group. The load of the information processing system for the predetermined information processing is reduced by executing the predetermined information processing for each mesh information group.

2 Claims, 6 Drawing Sheets

INFORMATION PROCESSING SYSTEM AND INFORMATION PROCESSING PROGRAM

CROSS-REFERENCED TO RELATED APPLICATION

This application is a National Stage entry of International Application No. PCT/JP2008/002064, filed Jul. 31, 2008, which claims priority to Japanese Patent Application No. 2007-255781, filed Sept. 28, 2007, the disclosure of the prior applications are incorporated in their entirety by reference.

BACKGROUND OF THE INVENTION

1. Technical Field

The present invention relates to an information processing system and the like to be mounted on a functional device which has a moving function or which is carried by a user.

2. Description of the Related Art

Conventionally, there is known a navigation system configured to display weather information in a plurality of areas, for appropriate route planning and the like of an automobile in view of the weather conditions. There is proposed a technique of reducing the weather information amount as the target thereof of the information processing, such as taking only the weather information in the area belonging to the current position of the automobile measured by a GPS as the target thereof of transmitting process, in order to improve efficiency of the processing of the weather information which increases along with the increase in the area (refer to US2007/0049260 A1).

However, in the case where information processing is executed taking the weather information not only in a part of the area but all of the area as the target thereof, and at the same time other information processing is executed, there is a possibility that these information processing may not be executed smoothly, because of the limitation of information processing ability.

SUMMARY OF THE INVENTION

In view of above, an object of the present invention is to provide a system and the like capable of smoothly executing information processing, even in the case where information processing is executed taking all of the information in relation to the target area as the target thereof, and at the same time other information processing is executed in parallel thereto.

According to a first aspect of the present invention, there is provided an information processing system which includes a position measuring unit, and which is mounted on a functional device having a moving function or carried by a user, comprising: a first processing unit which decides a mesh group including a position of the functional device measured by the position measuring unit among a plurality of mesh groups as a first mesh group, and which decides each of the other mesh groups as each of a second mesh group through an n-th mesh group (n=2, 3, . . . ), so that all of a target area is covered by a plurality of the mesh groups equal to or smaller than a predetermined size and which differs from each other; and a second processing unit which executes a predetermined information processing taking mesh information in relation to each mesh included in each mesh group as a target thereof, in the order from the first mesh group to the n-th mesh group decided by the first processing unit.

According to the information processing system of the first aspect of the invention, each of a plurality of the mesh groups differing from one another is decided as the first mesh group through the n-th mesh group (n=2, 3, . . . ), respectively. Thereafter, the predetermined information processing is executed taking the mesh information in relation to the meshes included in each mesh group as the target thereof, in the order from the first to the n-th mesh group. All of the target area is covered by a plurality of the mesh groups, so that the predetermined information processing may be executed taking the mesh information group in relation to all of the meshes included in the target area as the target thereof. Further, the mesh group including the measured position of the functional device is decided as the first mesh group, the predetermined information processing is executed taking the mesh information group with high relevancy or necessity to the user in view of the position of the functional device as the top priority target thereof. Further, because each mesh group is equal to or less than a predetermined size, it becomes possible to reduce load of the information processing system for the predetermined information processing, by executing the predetermined information processing per each mesh information group. Therefore, even in the case where the predetermined information processing is executed taking the mesh information in relation to all of the meshes included in the target area as the target thereof, and another information processing is executed in parallel thereto, it becomes possible to execute information processing smoothly. Here, the size of the mesh group is defined by a width of the mesh groups in a predetermined direction, a number of meshes included in the mesh group, and the like.

The information processing system of a second aspect of the invention is the information processing system of the first aspect of the invention, wherein the first processing unit decides the first mesh group so that the position of the functional device departs from a boundary region between the first mesh group and the mesh group adjacent to the first mesh group.

According to the information processing system of the second aspect of the invention, the first mesh group is decided so that the position of the functional device departs from the boundary region between the first mesh group and the other mesh group. This is from taking into consideration that the mesh information in relation to the meshes closer to the functional device has high relevancy or necessity for the user of the functional device than the mesh information in relation to the meshes farther from the functional device. Therefore, it is possible to determine the first mesh group appropriately from the view point of taking the mesh information having high relevancy or necessity for the user in view of the position of the functional device as the top priority target of the predetermined information processing.

The information processing system of a third aspect of the invention is the information processing system of the first aspect of the invention, wherein the first processing unit decides the second mesh group so that the position of the functional device is included therein.

According to the information processing system of the third aspect of the invention, the second mesh group is decided so as to overlap the portion of the first mesh group including the position of the functional device. Thereafter, by executing the predetermined information processing taking the mesh information in relation to each mesh included in each mesh group as the target thereof in the order of the first mesh group and the second mesh group, the mesh information in relation to the meshes included in the overlapping portion sequentially becomes the execution target of the predetermined information processing. Therefore, in the case where the mesh information in the overlapping portion is updated after the predetermined information processing is executed taking the mesh information group in relation to the first mesh group as the target thereof, for example, the predetermined information processing is promptly executed taking the mesh information after updating as the target thereof, by executing the predetermined information processing taking the mesh information group in relation to the second mesh group as the target thereof. As such, in the case where the mesh information having high relevancy or necessity for the user in view of the position of the functional device is updated, it becomes possible to promptly execute the predetermined information processing taking the mesh information after updating as the target thereof.

An information processing program of a fourth aspect of the invention is a program for making a computer mounted on a functional device, which includes a position measuring unit, and which has a moving function or is carried by a user, to function as an information processing system, comprising: a first processing unit which decides a mesh group including a position of the functional device measured by the position measuring unit among a plurality of mesh groups as a first mesh group, and which decides each of the other mesh groups as each of a second mesh group through an n-th mesh group (n=2, 3, . . . ), so that all of a target area is covered by a plurality of the mesh groups equal to or smaller than a predetermined size and which differs from each other; and a second processing unit which executes a predetermined information processing taking mesh information in relation to each mesh included in each mesh group as a target thereof, in the order from the first mesh group to the n-th mesh group decided by the first processing unit.

According to the information processing program of the fourth aspect of the invention, it becomes possible to make the computer mounted on the functional device to function as the information processing system capable of smoothly executing information processing, even in the case where information processing is executed taking all of the information in relation to the target area as the target thereof, and at the same time other information processing is executed in parallel thereto.

DETAILED DESCRIPTION OF THE PREFERRED EMBODIMENTS

Figure 1:
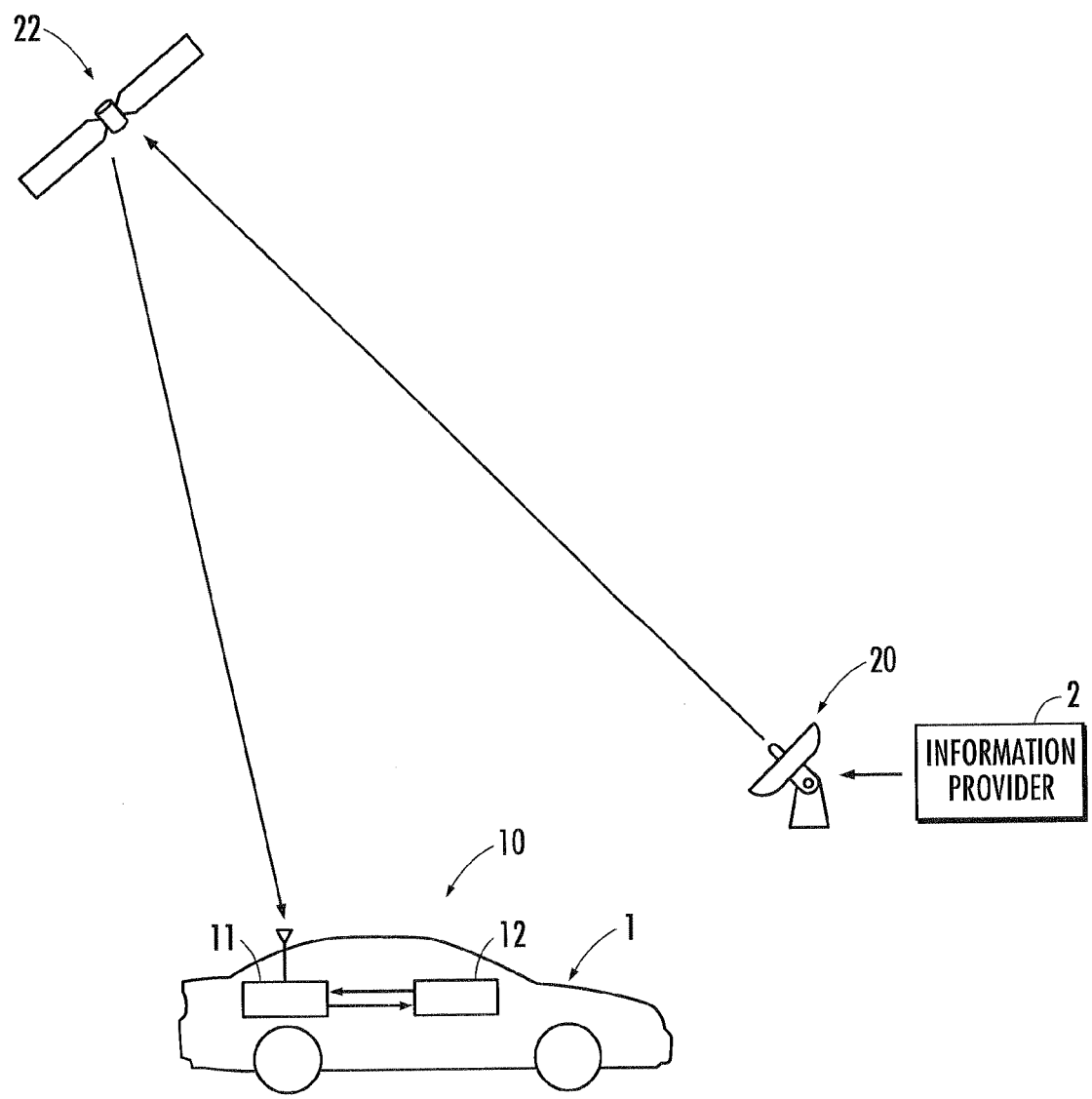
FIG. 1 is a view explaining the configuration of an information processing system.
Figure 2:
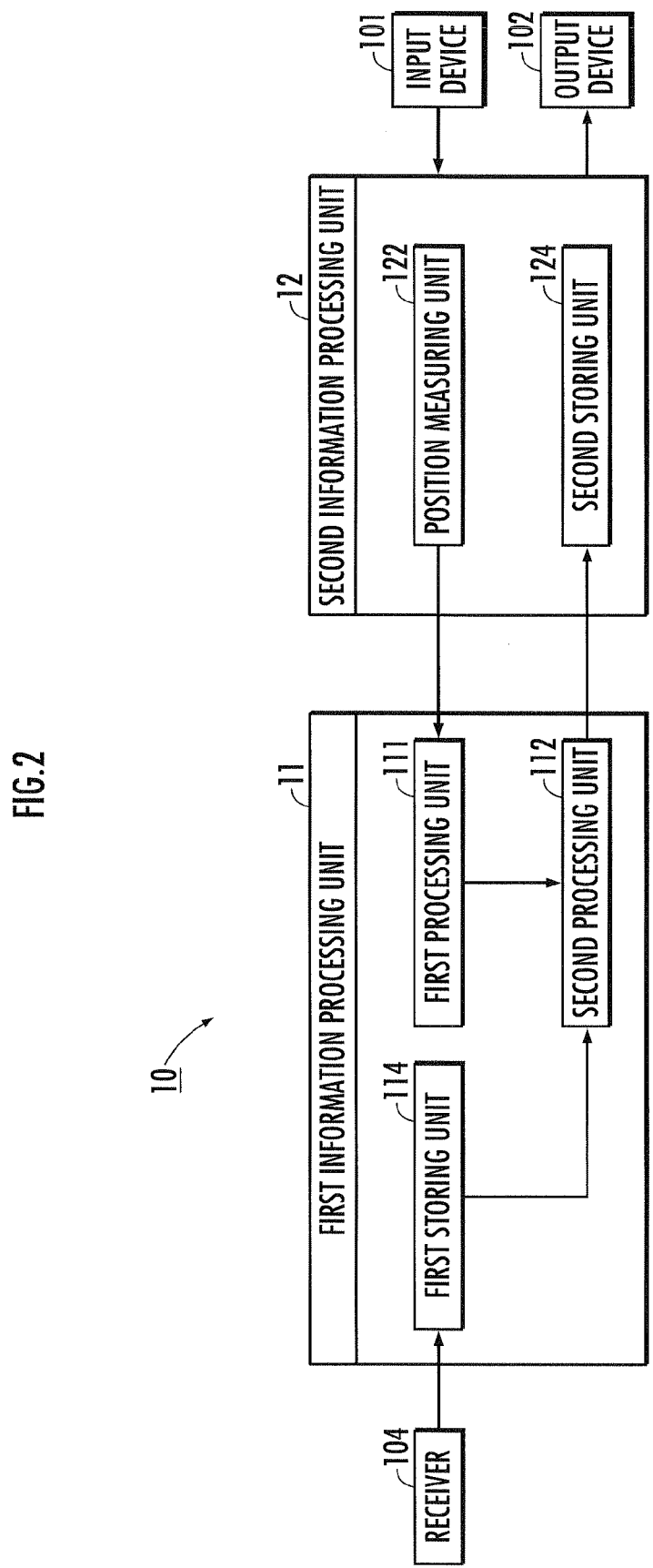
FIG. 2 is a view explaining the configuration of the information processing system.

An embodiment of an information processing system and the like according to the present invention will now be explained below with reference to the accompanying drawings. An information processing system 10 mounted on an automobile 1 shown in FIG. 1 is configured from a first information processing unit 11 and a second information processing unit 12. The first information processing unit 11 and the second information processing unit 12 are connected so as to enable communication therebetween via a signal wire. The information processing system 10 may be mounted on a functional device such as a robot having moving function, or a functional device such as a cellular phone carried by a user, other than the automobile 1. The first information processing unit 11 and the second information processing unit 12 may be mounted on the automobile 1 as one electronic control unit. An information processing program of the present invention is stored in a memory of a computer constituting one of or both of the first information processing unit 11 and the second information processing unit 12. The information processing program may be preliminarily stored in the memory, but may be installed to the computer via a recording medium such as a CD-ROM, and may also be delivered or broadcasted from a server and then stored in the memory.

The first information processing unit 11 is equipped with a first processing unit 111, a second processing unit 122, and a first storing unit 114. The first information processing unit 11 is connected with a receiver 104 for receiving mesh information broadcasted from an information provider 2 via a satellite antenna 20 and a satellite 22. The first information processing unit 11 may be equipped with the receiver 104 as a constituent element thereof, or the receiver 104 may be a mobile communication equipment such as a cellular phone connected to the first information processing unit 11. The mesh information received by the receiver 104 is stored in the first storing unit 114. In order to cover all of a target area by a plurality of mesh groups equal to or smaller than a predetermined size and which differs from one another, the first processing unit 111 determines, among a plurality of the mesh groups, a mesh group including the position of the automobile 1 measured by a position measuring unit 122 as a first mesh group, and determines other mesh groups as a second mesh group through an n-th mesh group (n=2, 3, . . . ), respectively. The second processing unit 112 performs a predetermined information processing taking the mesh information stored in the first storing unit 114 in relation to each mesh included in each mesh group as the target thereof, in the order from the first mesh group to the n-th mesh group which is decided by the first processing unit 111, and then performs the predetermined information processing taking the mesh information in relation to each mesh included in an i+1-th mesh group which is also decided by the first processing unit 111 as the target thereof.

The second information processing unit 12 is connected with an input device 101 such as an operating button or a microphone of a navigation device, and an output device 102 such as a display or a loudspeaker. The second information processing unit 12 may be equipped with the input device 101 and the output device 102 as the constituent element thereof. The second information processing unit 12 is equipped with the position measuring unit 122 and a second storing unit 124. The position measuring unit 122 measures the position (latitude, longitude) of the automobile 1, on the basis of a GPS signal received by a GPS receiver mounted on the automobile 1, or an output signal of an acceleration sensor mounted on the automobile 1. The second storing unit 124 is stored with the mesh information transmitted from the first information processing unit 11 to the second information processing unit 12. The second information processing unit 12 searches for a route to a destination position input through the input device 101 on the basis of a map data stored in a map storing unit, and outputs the route to the output device 102 together with the map. The shape and position of roads, buildings, parks and the like are expressed as a sequence or a set of coordinates (latitude, longitude) by the map data. The second information processing unit 12 outputs the mesh information stored in the second storing unit 124 to the output device 102, by associating the same to the map.

The function of the information processing system 10 of the above-mentioned configuration will be explained below. When an IGN (ignition) switch of the automobile 1 is switched from ACC/OFF to ACC/ON, electricity is supplied from an in-vehicle battery to in-vehicle equipments such as the first information processing unit 11 or the second information processing unit 12. In the second information processing unit 12, the position measuring unit 122 measures the position (latitude, longitude) of the automobile 1, on the basis of the GPS signal received by the GPS receiver mounted on the automobile 1 or the output signal of the acceleration sensor mounted on the automobile 1. The second information processing unit 12 transmits the measurement result to the first information processing unit 11.

Figure 3:
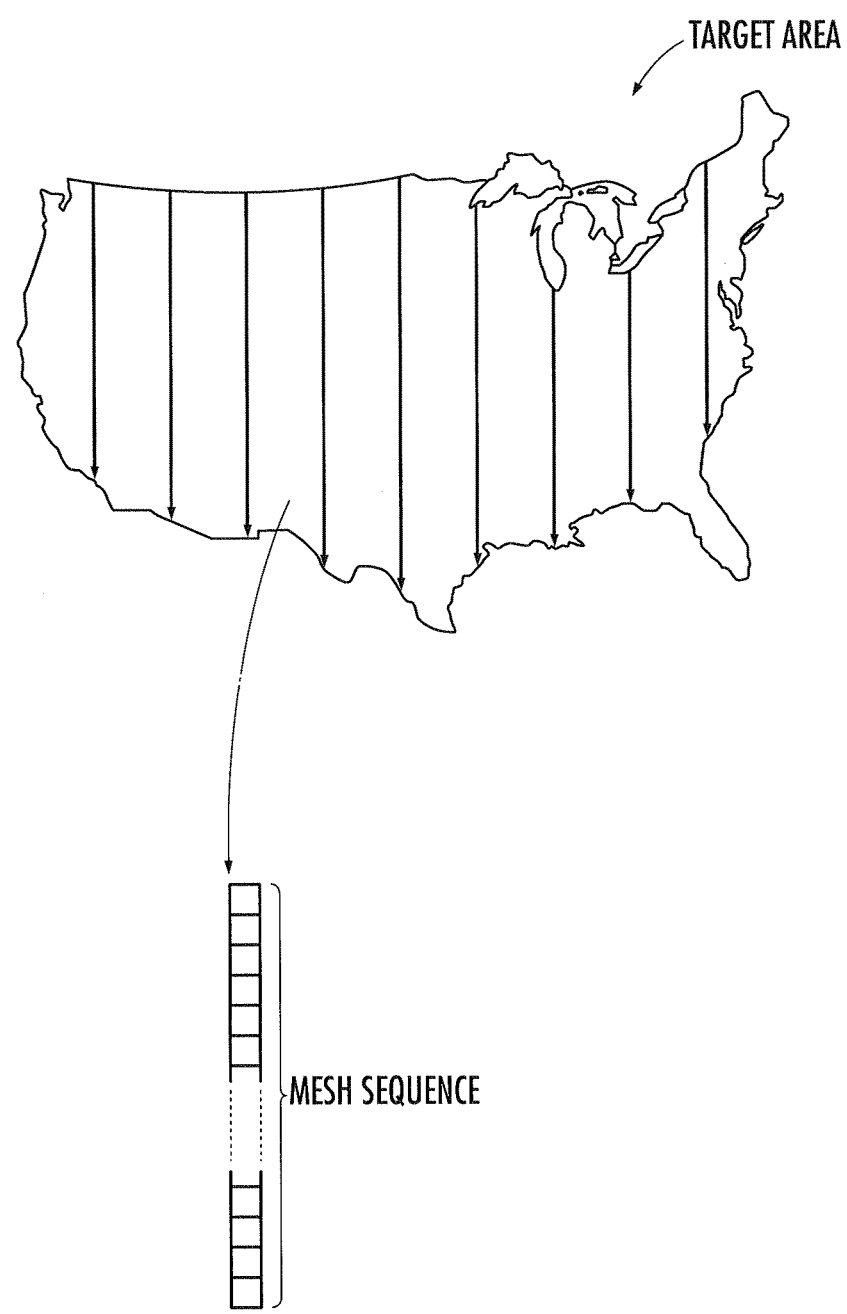
FIG. 3 is an explanatory view in relation to a target area and meshes.

The mesh information broadcasted from the satellite is associated to each of a plurality of the meshes included in the target area. For example, as is shown in FIG. 3, the area of the United States of America excluding Alaska in the North American Continent is selected as the target thereof area, and the mesh information is associated to each of a plurality of the rectangular meshes which divides the target area in the latitude direction and the longitude direction. In order to make the broadcasted data size appropriate in view of the broadcast band width, the mesh information is broadcasted per each mesh sequence aligned in the latitude direction, as is shown in FIG. 3.

Figure 4:
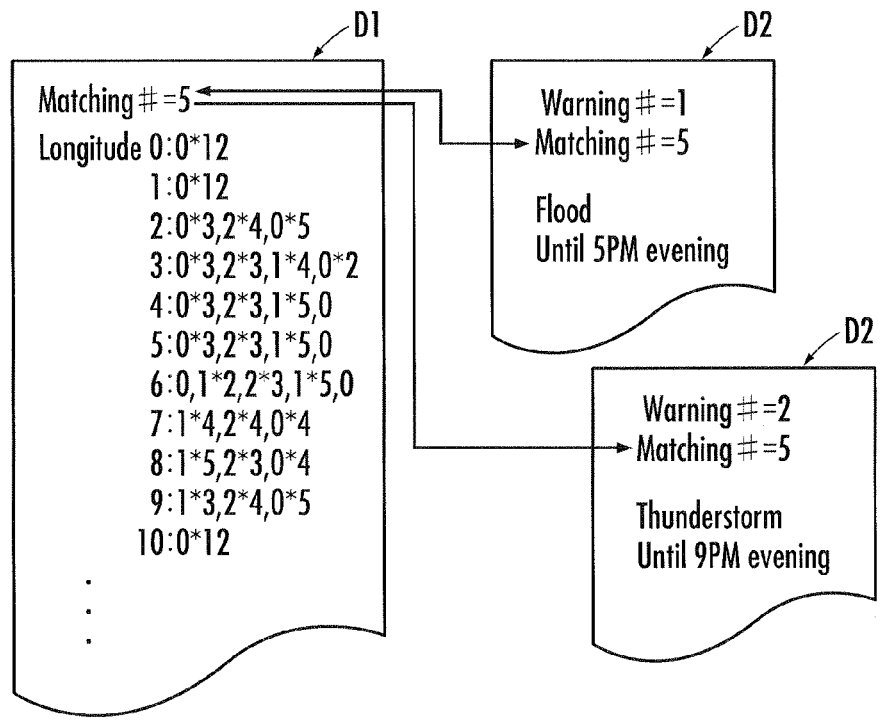
FIG. 4 is an explanatory view in relation to a data structure of mesh information.
Figure 4:
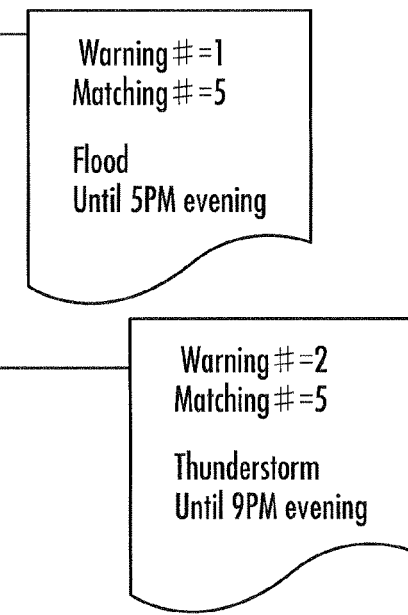

The mesh information is configured from a mesh warning data D1 and a mesh information data D2, as is shown in FIG. 4(a). The mesh warning data D1 is configured from a matching number (Matching#) 5, and an array pattern (0*12), (0*12), (0*3, 2*4, 0*5), . . . of a warning number (Warning#) per each mesh sequence represented by a latitude identification number (Latitude) 0, 1, 2, . . . shown in the left side of FIG. 4(b). The mesh information data D2 is configured from the warning number 1, 2, . . ., weather information ("Flood until 5PM evening" "Thunderstorm Until 9PM evening" . . . ) linked thereto, and the matching number 5. As is shown in FIG. 4(b), the matching number and the warning number, respectively, per each mesh identified by a mesh warning data D1, and the matching number and the warning number, respectively, of the mesh information data D2 are linked together, and the mesh information is stored in the first storing unit 114 and the second storing unit 124, respectively.

Figure 5:
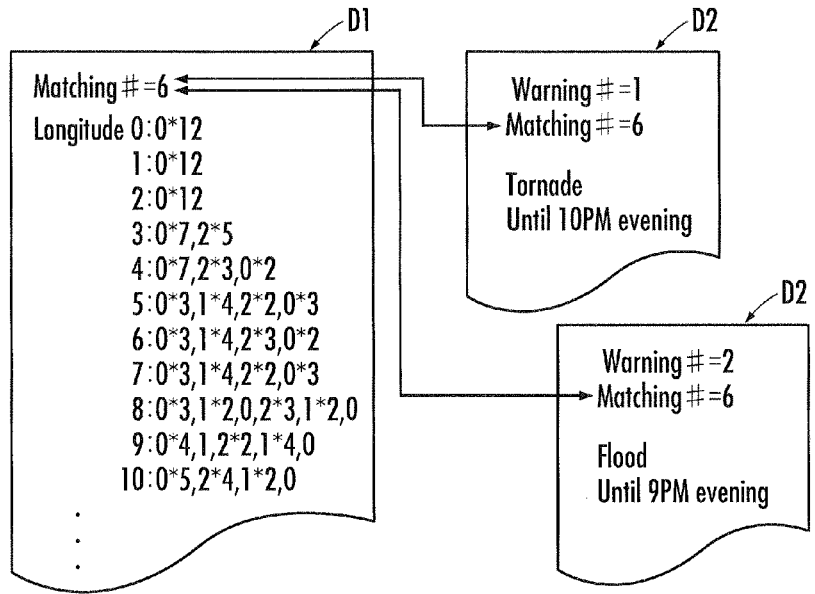
FIG. 5 is an explanatory view in relation to updating of the mesh information.
Figure 5:
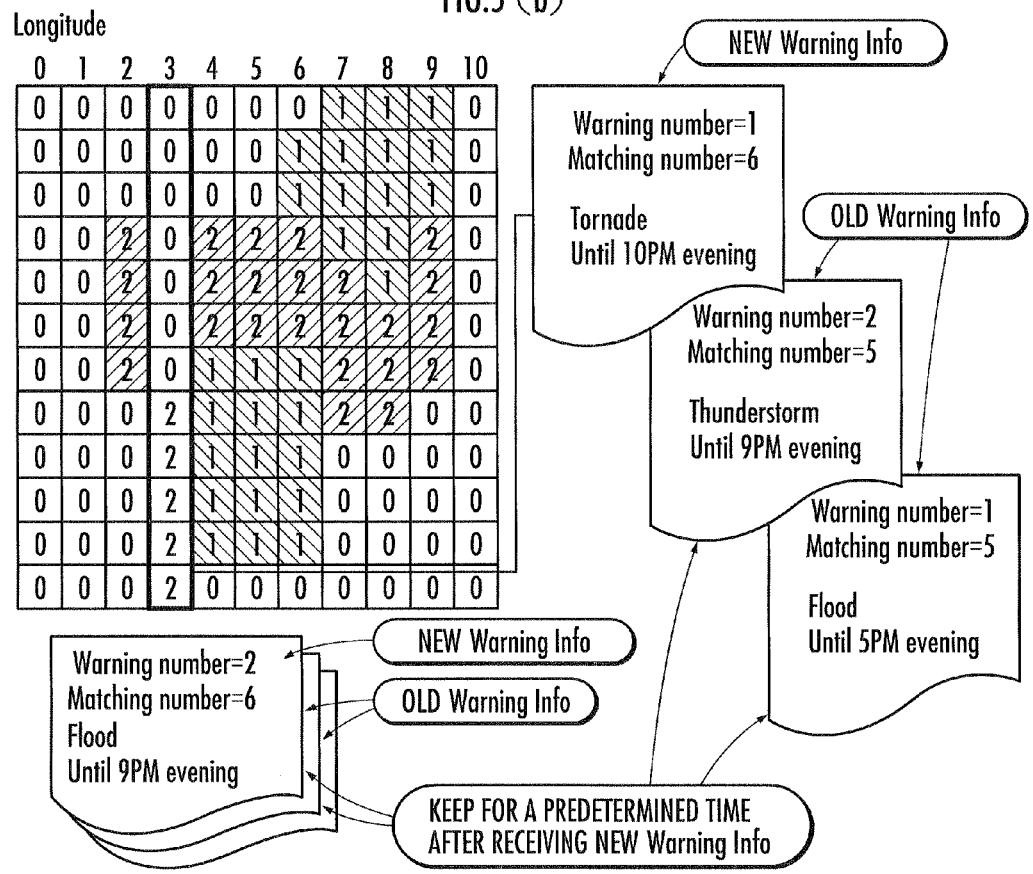

The mesh information is sequentially updated by the information provider 2. For example, the mesh information shown in FIG. 4(a) is updated to the mesh information configured from the mesh warning data D1 and the mesh information data D2 linked by the matching number 6 as is shown in FIG. 5(a). The updated mesh information is broadcasted per each mesh sequence by the satellite as is explained above, the mesh information stored in the first storing unit 114 or the second storing unit 124 is updated per each mesh sequence. For example, as is shown in FIG. 5(b), the mesh information related to the meshes included in the mesh sequence identified by a heavy line may only be updated. Further, after the updated mesh information related to a part of the meshes is received by the receiver 104, the state where the mesh information related to all the meshes before updating is stored in the first storing unit 114 or the second storing unit 124 is maintained for a constant period of time. By doing so, the old mesh information before updating and the new updated mesh information are both stored in the first storing unit 114 or the second storing unit 124, but the latest weather information related to each mesh may be specified by checking with the matching number.

The mesh information broadcasted from the satellite 22 is received by the receiver 104, and is stored in the first storing unit 114 of the first information processing unit 11. As explained above, on the basis of the measurement result of the position measuring unit 122 transmitted from the second information processing unit 12 to the first information processing unit 11, the first processing unit 111 determines a plurality of the mesh groups included in the target area as the h mesh group (i=1, 2, . . . ).

First, the first mesh group is decided from the mesh group including the position of the automobile 1, so that the position of the automobile 1 departs from a boundary region with other mesh groups within the mesh group.

Specifically, among a primary set of the mesh groups previously stored in the memory constituting the first information processing unit 11, the mesh group including the position of the automobile 1 is decided. For example, as is shown in FIG. 6(a), the set of four mesh groups A through D covering all of the target area is defined as the primary set of the mesh group. The target area is drawn by a longitude range $[x|x_0,x_8]$. Each of the mesh groups A through D dividing the target area in the longitudinal direction is drawn by the longitude range $[x|x_0, x_2(=x_0+\Delta)]$, $[x|x_2,x_4(=x_0+2\Delta)]$, $[x|x_4,x_6(=x_0+3\Delta)]$ and $[x|x_6,x_8(=x_0+4\Delta)]$, respectively. Each mesh group included in the primary set is defined so that the width (size) in the latitudinal direction thereof is equal to or smaller than a predetermined size. Here, each mesh group may be defined so that the number (size) of the meshes included therein is equal to or less than a predetermined size. The size of each mesh group may be identical or different. For example, when the automobile 1 is positioned at a point $p_1$ or a point $p_2$ included in the mesh group B shown in FIG. 6(a), the mesh group B is decided as the mesh group including the position of the automobile 1.

Further, it is determined whether or not the automobile 1 departs from the boundary region with the adjacent mesh group in the mesh group including the position of the automobile 1. For example, it is determined whether or not the position of the automobile 1 departs from the boundary regions (shaded area) with the western adjacent mesh group A and the eastern adjacent mesh group C in the mesh group B as shown in FIG. 6(a). The boundary region of the western side and the eastern side of the mesh group B, respectively, are drawn by the longitude range $[x|x_2,x_2+\alpha\Delta(0<\alpha<0.25)]$ and $[x|x_4-\alpha\Delta,x_4]$, respectively.

In the case where the determination result is positive, that is, it is determined that the position of the automobile 1 departs from the boundary region, the mesh group including the position of the automobile 1 is decided as the first mesh group. For example, when the automobile 1 is positioned at the point $p_1$ departing from the boundary region of the mesh group B as is shown in FIG. 6(a), the mesh group B is decided as the first mesh group.

Figure 6:
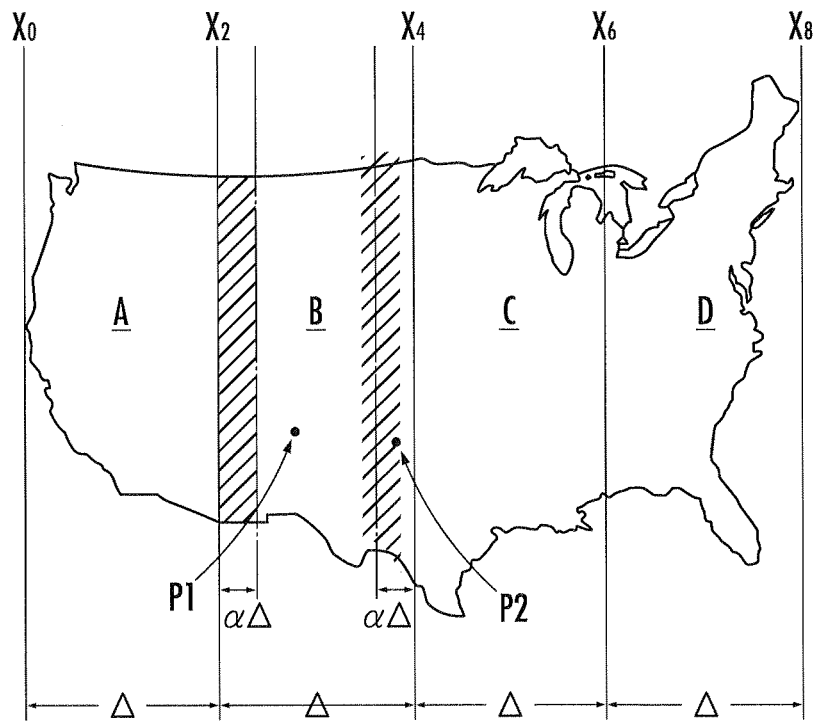
FIG. 6 is an explanatory view in relation to a determination method of a first through an n-th mesh group.
Figure 6:
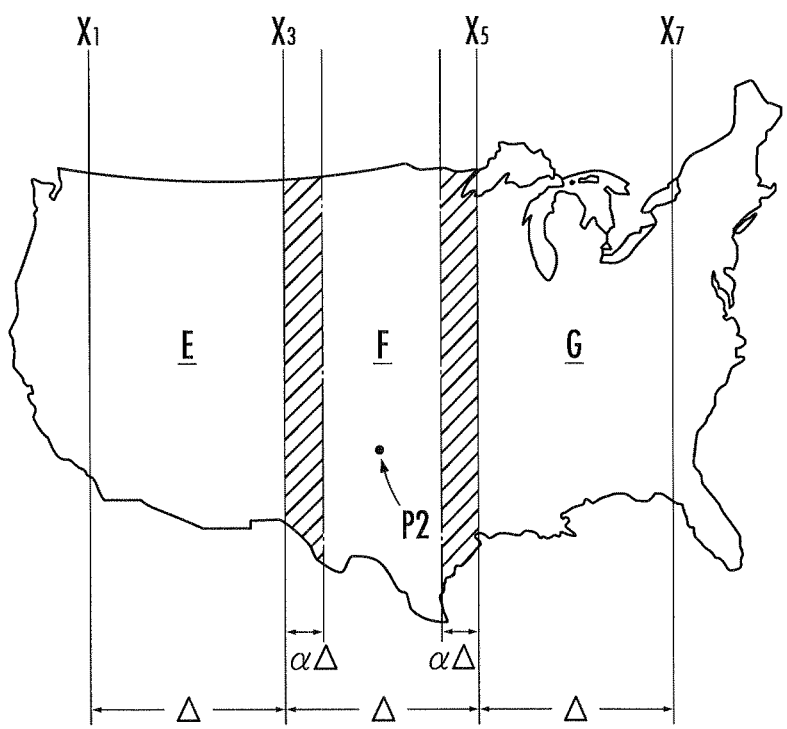

On the other hand, in the case where the determination result is negative, that is, in the case where it is determined that the position of the automobile is included in the boundary region, the mesh group including the position of the automobile 1 is decided from a secondary set of mesh groups differing from the primary set. For example, in the case where it is determined that the automobile 1 is positioned at the point $p_2$ included in the boundary region at the eastern side in the mesh group B indicated in FIG. 6(a), the mesh group including the position of the automobile 1 is decided from the secondary set of mesh groups previously stored in the memory constituting the first information processing unit 11. For example, a set of three mesh groups F through G which covers the central portion of the target area is defined as the secondary set of the mesh groups, as is shown in FIG. 6(*b*). The mesh groups E through G, respectively, are drawn by the longitude ranges $[x|x_1(=x_0+\beta\Delta(\alpha<\beta\leqq 1-\alpha)), x_3(=x_2+\beta\Delta)]$, $[x|x_3, x_5(=x_4+\beta\Delta)]$, and $[x|x_5, x_7(=x_6+\beta\Delta)]$, respectively. Each mesh group included in the secondary set is defined so that the width (size) in the latitudinal direction thereof is equal to or smaller than the predetermined size. For example, in the case where the automobile 1 is positioned at the point $p_2$ included in the mesh group F shown in FIG. 6(*b*), the mesh group F is decided as the mesh group including the position of the automobile 1.

Further, it is determined whether or not the automobile 1 departs from the boundary regions (shaded area) in the mesh group F including the automobile position 1 between the western adjacent mesh group E or the eastern adjacent mesh group G. The boundary regions of the western side and eastern side of the mesh group F are drawn by the longitude range $[x|x_3, x_3+\Delta\alpha]$ and $[x|x_5-\alpha\Delta, x_5]$, respectively.

In the case where the determination result is positive, that is, in the case where it is determined that the position of the automobile 1 departs from the boundary region, the mesh group including the position of the automobile 1 is decided as the first mesh group. For example, in the case where the automobile 1 is positioned at the point $p_2$ departing from the boundary region of the mesh group F shown in FIG. 6(*b*), the mesh group F is decided as the first mesh group.

After the first mesh group is decided, the mesh groups differing from the first mesh group are decided as the second mesh group through the n-th mesh group (n=2, 3, . . . ), respectively. For example, in the case where the mesh group B included in the primary set shown in FIG. 6(*a*) is decided as the first mesh group, each of the other mesh groups A, C and D are decided as any one of the second, third, and fourth mesh groups. The mesh group C, the mesh group D, and the mesh group A in the order close to the first mesh group in the eastward direction may be decided as the second, the third, and the fourth mesh group, respectively. Further, in the case where the mesh group F included in the secondary set of the mesh groups shown in FIG. 6(*b*) is decided as the first mesh group, each of the other mesh groups A, B, C and D are decided as any one of the second, third, fourth, and fifth mesh groups. The reason for deciding the mesh groups included in the primary set as the second mesh group and the like, and not those included in the second set, is because the three mesh groups F through G included in the secondary set does not cover all of the target area. Of the mesh groups A through D, the mesh group B overlapping the mesh group F, which is the first mesh group, at the area including the position of the automobile 1 may be decided as the second mesh group (refer to FIGS. 6(*a*) and (*b*)).

Here, the second mesh group through the n-th mesh group may be decided on the basis of the direction of movement of the automobile 1 measured based on output signals from in-car gyro sensor and the like. For example, in the case where the vector of the direction of movement of the automobile 1 includes a component in the eastward direction, the mesh group adjacent to the first mesh group at the eastern side thereof may be decided as the second mesh group.

After the first through the n-th mesh groups are decided by the first processing unit 111, the second processing unit 112 sequentially executes a predetermined information processing taking the mesh information in relation to the meshes included in each mesh group as the target thereof, in the order from the first through the n-th mesh group. Thereafter, the series of predetermined information processing executed in the order from the first to the n-th mesh group is repeated. As the predetermined information processing, the second processing unit 112 executes reading process from the first storing unit 114 and a transmission process to the second information processing unit 12. In accordance thereto, the second information processing unit 12 executes information processing for outputting the weather information included in the mesh information to the output device 102. By doing so, weather information may be output in a form recognizable by the user via visual perception or auditory perception from the output device 102. Then, the user may consider altering and the like of the route planning, by referring to local weather information in the target area which is displayed and the like by the output device 102. Here, the second information processing unit 12 may be equipped with a second processing unit independently from the first information processing unit 11, and this second processing unit may execute information processing for outputting weather information included in the mesh information to the output device 102, as the predetermined information processing.

According to the information processing system 10 exerting the above-described functions, each of a plurality of the mesh groups differing from one another is decided as the first mesh group through the n-th mesh group (n=2, 3, . . . ), respectively. Thereafter, the predetermined information processing is executed taking the mesh information in relation to the meshes included in each mesh group as the target thereof, in the order from the first to the n-th mesh group. All of the target area is covered by a plurality of the mesh groups, so that the predetermined information processing may be executed taking the mesh information group in relation to all the meshes included in the target area as the target thereof (refer to FIGS. 6(*a*) and (*b*)). Further, the mesh group including the measured position of the automobile 1 is decided as the first mesh group, the predetermined information processing is executed taking the mesh information group with high relevancy or necessity to the user in view of the position of the automobile 1 as the top priority target thereof. Further, because each mesh group is equal to or less than a predetermined size, it becomes possible to reduce load of the information processing system 10 for the predetermined information processing, by executing the predetermined information processing per each mesh information group. Therefore, even in the case where the predetermined information processing is executed taking the mesh information in relation to all of the meshes included in the target area as the target thereof, and another information processing (for example, a route search by the second information processing unit 12) is executed in parallel thereto, it becomes possible to execute these information processing smoothly.

Further, the first mesh group is decided so that the position of the automobile 1 departs from the boundary region between the first mesh group and the adjacent mesh group (refer to FIGS. 6(*a*) and (*b*)). This is from taking into consideration that the mesh information in relation to the meshes closer to the automobile 1 has high relevancy or necessity for the user of the automobile 1 than the mesh information in relation to the meshes farther from the automobile 1. Therefore, it is possible to decide the first mesh group appropriately from the view point of taking the mesh information having high relevancy or necessity for the user in view of the position of the automobile 1 as the to priority target of the predetermined information processing.

Still further, in the case where the mesh group F shown in FIG. 6(*b*) is decided as the first mesh group, the mesh group B shown in FIG. 6(*a*), which overlaps the portion including the position of the automobile 1 in the first mesh group is decided as the second mesh group. Thereafter, by executing the predetermined information processing taking the mesh information in relation to each mesh included in each mesh group as the target thereof in the order of the first mesh group and the second mesh group, the mesh information in relation to the meshes included in the overlapping portion sequentially becomes the execution target of the predetermined information processing. Therefore, in the case where the mesh information in the overlapping portion is updated after the predetermined information processing is executed taking the mesh information group in relation to the first mesh group as the target thereof (refer to FIG. 5), for example, the predetermined information processing is promptly executed taking the mesh information after updating as the target thereof, by executing the predetermined information processing taking the mesh information group in relation to the second mesh group as the target thereof. Therefore, in the case where the mesh information having high relevancy or necessity for the user in view of the position of the automobile is updated, it becomes possible to promptly execute the predetermined information processing taking the mesh information after updating as the target thereof.

The invention claimed is:

1. An information processing system which includes an output device and a position measuring unit, and which is mounted on a functional device having a moving function or carried by a user, comprising:
   a receiver configured to receive mesh information including weather information;
   a storing unit configured to store the mesh information received by the receiver;
   a first processing unit configured to decide a mesh group including a position of the functional device measured by the position measuring unit among a plurality of mesh groups as a first mesh group, and which decides each of the other mesh groups as each of a second mesh group through an n-th mesh group (n=2, 3, . . . ), so that all of a target area is covered by a primary set of a plurality of the mesh groups equal to or smaller than a predetermined size and which differs from each other; and
   a second processing unit configured to execute a predetermined information processing taking mesh information in relation to each mesh included in each mesh group as a target thereof, in the order from the first mesh group to the n-th mesh group decided by the first processing unit for reading from the storing unit and for outputting to display the weather information included in the mesh information to the output device;
wherein the first processing unit determines whether or not the position of the functional device departs from a boundary region between the first mesh group and the mesh group adjacent to the first mesh group, and in a case where the position of the functional device is included in the boundary region, a mesh group including the position of the functional device among a secondary set of a plurality of mesh groups different from the primary set is decided as the first mesh group.

2. The information processing system according to claim 1, wherein the first processing unit decides the second mesh group so that the position of the functional device is included therein.

* * * * *